United States Patent [19]

Clark et al.

[11] Patent Number: 5,235,337

[45] Date of Patent: Aug. 10, 1993

[54] SEARCH AND RESCUE TRANSPONDER HOUSING

[75] Inventors: Mark S. Clark, Ft. Lauderdale; Edward I. Nelson, Plantation, both of Fla.

[73] Assignee: ACR Electronics, Inc., Fort Lauderdale, Fla.

[21] Appl. No.: 864,489

[22] Filed: Apr. 7, 1992

[51] Int. Cl.$^5$ .............................................. G01S 13/74
[52] U.S. Cl. ...................................... 342/51; 361/814
[58] Field of Search .......................... 342/51; 361/380; 174/52.1

[56] References Cited

U.S. PATENT DOCUMENTS 4,673,936 6/1987 Kotoh .................................... 342/51
4,992,794 2/1991 Brouwers .............................. 342/51

Primary Examiner—T. H. Tubbesing
Attorney, Agent, or Firm—Malin, Haley, DiMaggio & Crosby

[57] ABSTRACT

An improved search and rescue transponder having an improved housing assembly that permits the device to be turned on or off by rotating one segment of the housing relative to the other for ease of use even with heavy or bulky gloves. In addition, the housing assembly exterior surface includes a plurality of longitudinal ridges for ease in gripping. The housing assembly includes an upper housing and lower housing joined by a retaining ring and O-ring seal, eliminating the need for fasteners for manufacturing efficiency. The lower housing includes quick disconnect that attaches to a mounting disk affixed to a ship or life raft. The mounting disk includes a plurality of resilient fingers which act in conjunction with cam surfaces on the flange of the lower housing, which when rotated together allow for a quick disconnect. The improved overall reduced size and configuration of the housing assembly contains five batteries arranged circularly in a side-by-side array, packed together in the lower housing, allowing for a SART of reduced length and easily handling configuration.

10 Claims, 4 Drawing Sheets

SEARCH AND RESCUE TRANSPONDER HOUSING

BACKGROUND OF THE INVENTION

1. Field of the Invention

This invention relates generally to a search and rescue radar transponder which sends out a coded signal of distress at radar frequencies in response to a search radar pulse, and in particular, to a search and rescue radar transponder having an improved housing assembly which reduces the overall size, increases the operability and ease of use and reduces manufacturing costs.

2. Description of the Prior Art

Search and rescue radar transponders (SART) are known in the prior art. Typically, search and rescue transponders are carried aboard a ship and can be removed, transported and installed in a raised location aboard a life raft. Conventional search and rescue transponders are elongated and bulky due to the required number of batteries therein, shaped much like a 5-cell flashlight, making them often awkward to use in a survival situation. A search and rescue radar transponder oftentimes is the primary means for locating an ocean or water survival craft, using a standard ship's search radar. Typically a SART would operate on 9-gigahertz frequency band and send a series of pulse responses once interrogated by a conventional shipborne or airborne search radar. A series of blips are received from the SART to the radar screen aboard the searching ship, which is readily recognized as a distinctive signal of distress.

One primary concern is the fact that in a survival situation, especially in cold water, the user will typically have on very bulky clothing, including gloves. Ease of activation of the SART is crucial to insure that the device is activated by the user at the proper time. Agile manipulation is also required with respect to quickly disconnecting a SART from a ship for connection to a raft. The overall size and configuration of a SART is very important to get the most battery power from the least volume because the SART is hand activated, and at the same time should take up very little storage space when not in use.

The present invention provides for an improved SART that has an improved housing assembly which is waterproof and quite durable, is easy to manufacture, gives maximum battery storage space for the size and volume of the housing assembly, can quickly be mounted or disconnected from either shipboard or a life raft, and can easily be activated by a user wearing bulky gloves. The present invention further includes a unique retaining ring that joins the upper and lower housings together without screws or other labor intensive fasteners, reducing the overall cost of manufacture. The retaining ring does not induce cold flow plastic problems because the joined components are not under pressure.

SUMMARY OF THE INVENTION

A search and rescue radar transponder comprising a rigid, durable, water impervious two-piece housing assembly, forming a container for containing radar transponder circuitry, an antenna, a battery power supply, an audio signal device and a light, all mounted within the watertight container. The housing assembly is comprised of a lower cylindrical housing having a hollow interior with a closed end and an open top and a central column with a threaded hole, said lower housing having a plurality of raised exterior longitudinal ridges spaced strategically about its outside periphery for gripping said lower housing in one hand. The lower housing is sized to receive a battery pack of five C-sized batteries arranged in a side-by-side array circularly about the central column parallel to each other in a compact array. A retaining plate can be fastened to the central column, with foam cushions between the batteries and plate and batteries and the floor of the lower housing.

The 5-cell circular battery array with the batteries adjacent to each other and not extended in a single, longitudinal line, greatly alters the overall configuration for containing the most batteries in the least compact volume. Thus, the lower housing acts as a container for five batteries, providing the power supply to the device, and defining the overall configuration size.

The upper housing is also essentially cylindrical with a substantially hollow section containing the necessary radar transponder transmitter and receiver circuitry and antenna to provide a 9-gigahertz radar transponder that will provide a plurality of pulses of a distinctive nature on the search radar receiver of a ship or aircraft. The upper housing includes at its topmost portion, a clear plastic lens which has a light bulb within.

The upper housing is sealably connectable to the lower housing by a flexible plastic retaining ring, having annular lips on each inner side which grasp annular flanges on the upper and lower housings, the housing upper and lower segments being joined together with an O-ring for sealing purposes by the retaining ring. The purpose of the retaining ring is to allow the upper and lower housings to be joined together in a sealed manner with the O-ring without requiring screws or other fasteners. The structure permits relative rotation between the upper housing and the lower housing. The plastic retaining ring has split end segments that can be slightly separated and expanded slightly radially outward so that the ring can be placed over and about the annular flanges of each housing but resilient enough to firmly hold the upper housing to the lower housing once in place. As an additional holding measure, the retaining ring has at its free ends a pair of apertures for receiving a lanyard that is tied securely, tying the ends of the retaining ring together, thereby prohibiting radial expansion of the retaining ring. The lanyard can also be used to connect the SART to the user.

In addition, a locking pin may be used and inserted through the upper housing flange and lower housing flange vertically to prevent rotation of the upper housing relative to the lower housing to prevent inadvertent turn on, as is described in greater detail below.

A mounting disk is provided that includes a raised circular wall and flexible resilient fingers which lock on yet another annular flange around the base of the lower housing in a snap-on manner so that the lower housing can be easily attached to the base mounting disk which itself may be secured permanently to a life raft. The mounting disk reacts to quick-release feature which allows the lower housing to be quickly detached from the mounting disk by virtue of cam shaped surfaces on the lower housing flange to move the fingers outwardly for quick disconnect. This allows the user to disconnect the entire SART, which has been previously mounted aboard ship to be utilized in an emergency and manually carried aboard a raft if the ship were sinking. With the quick-release disk mount and housing, the user can quickly rotate the entire SART relative to the mounting disk and the fingers will engage cams that allow the fingers to release the entire lower housing.

The upper housing exterior surface includes longitudinal peripheral ridges similar to the ones disposed around the lower housing exterior surface. The purpose of these raised ridges is to allow the user to rotate the lower housing with one hand relative to the upper housing in the other hand. The two housing segments rotate relative to each other as a switch electrically to activate or deactivate (turn off) the SART. The housing assembly eliminates tiny switches which might be otherwise difficult to actuate with bulky gloves or mittens on or holes through the container which might be prone to leakage. Thus, the entire housing assembly in effect becomes the electrical actuating switch and due to its size, makes rotation easy for one to rotate the top segment relative to the bottom segment. A magnet and reed switches are utilized for actuation to turn the device on by rotating the top housing relative to the bottom housing or to a test position. The upper housing includes bottom stepped cicumferential portion that engages a stop mounted on the bottom housing to limit rotation between the top housing and the bottom housing to approximately 90 degrees for movement into and out of the necessary on/test/off switch positions. In a typical embodiment, the SART includes an ON position, an OFF position which is in the middle, a TEST position for testing the batteries, and audio-visual indicators, i.e., light and buzzer. A magnet in the retaining ring and two reed switches mounted in the upper housing on the P.C. board provide electrical switches for ON and Test. In addition, there is a locking pin that has a lanyard (as an aid for removal and means of retention for reinstalling in the ON position) that ensures the device cannot be turned on inadvertently unless the locking pin is retracted. Thus, the locking pin in position prevents any rotation between the upper housing and the lower housing.

An audio tone generator and visual light are provided that allow the user to know that the batteries are operable by providing in the test position an audio sound and light and providing an audio sound if a radar signal is received and the device is actuated. In the ON position, the light will blink periodically and if a radar signal is received from a search radar, an audio sound will activate for each radar signal.

The housing assembly is made of a Centrex (a trademark) durable plastic which resists ultraviolet breakdown and may include in the lower housing top and bottom foam cushions for the battery pack mounted therein with a top plate and screw in the central column that holds the batteries firmly in place.

Aboard ship, the SART is mounted to a disk connected permanently to the ship. To operate the device, the user would typically disengage the entire SART from the mount aboard ship and take the SART to a life raft, assuming that the ship was sinking. The entire housing assembly may be quick-snapped onto the mounting disk that is permanently mounted on the life raft. The user at any time removes the pin and rotates the upper housing relative to the lower housing to the "ON" position for quickly putting the device in an operating mode. A test can also be made at the same time to assure that the batteries are operating by providing a buzzer sound and a steady light if the batteries are good.

While the device is on, if a ship or airborne radar signal is received by the transponder, in addition to sending out the unique radar signature of the SART, the radar signal will activate the buzzer and or light so that the user knows that a radar signal has been received from a search radar.

The retaining ring may also be wrapped in reflective tape as an additional device for sighting and holding the ring on firmly.

The entire unit, besides having the capability of being mounted on a shipboard location or on a life raft, can float on top of the water if accidentally dropped.

By having a configuration which includes a lower housing size slightly larger in axial length than one C-sized battery, the device is very compact and can be easily held and manipulated. Secondly, the device can be easily actuated by rotation of the housing assembly as the activating switch. The device can be quickly disconnected or attached to a ship or life raft.

It is an object of this invention to provide an improved search and rescue radar transponder that is sized and has a configuration for ease of use.

It is another object of this invention to provide an improved search and rescue radar transponder having an improved housing and actuating switch for ease of use.

Yet still another object of this invention is to provide a search and rescue transponder that can be quickly mounted or disconnected from a ship or life raft.

But yet still another object of this invention is to provide an improved search and rescue transponder housing that includes a retaining ring that allows the housing to be made more efficiently.

In accordance with these and other objects which will become apparent hereinafter, the instant invention will now be described with particular reference to the accompanying drawings.

DESCRIPTION OF THE PREFERRED EMBODIMENT

Figure 1:
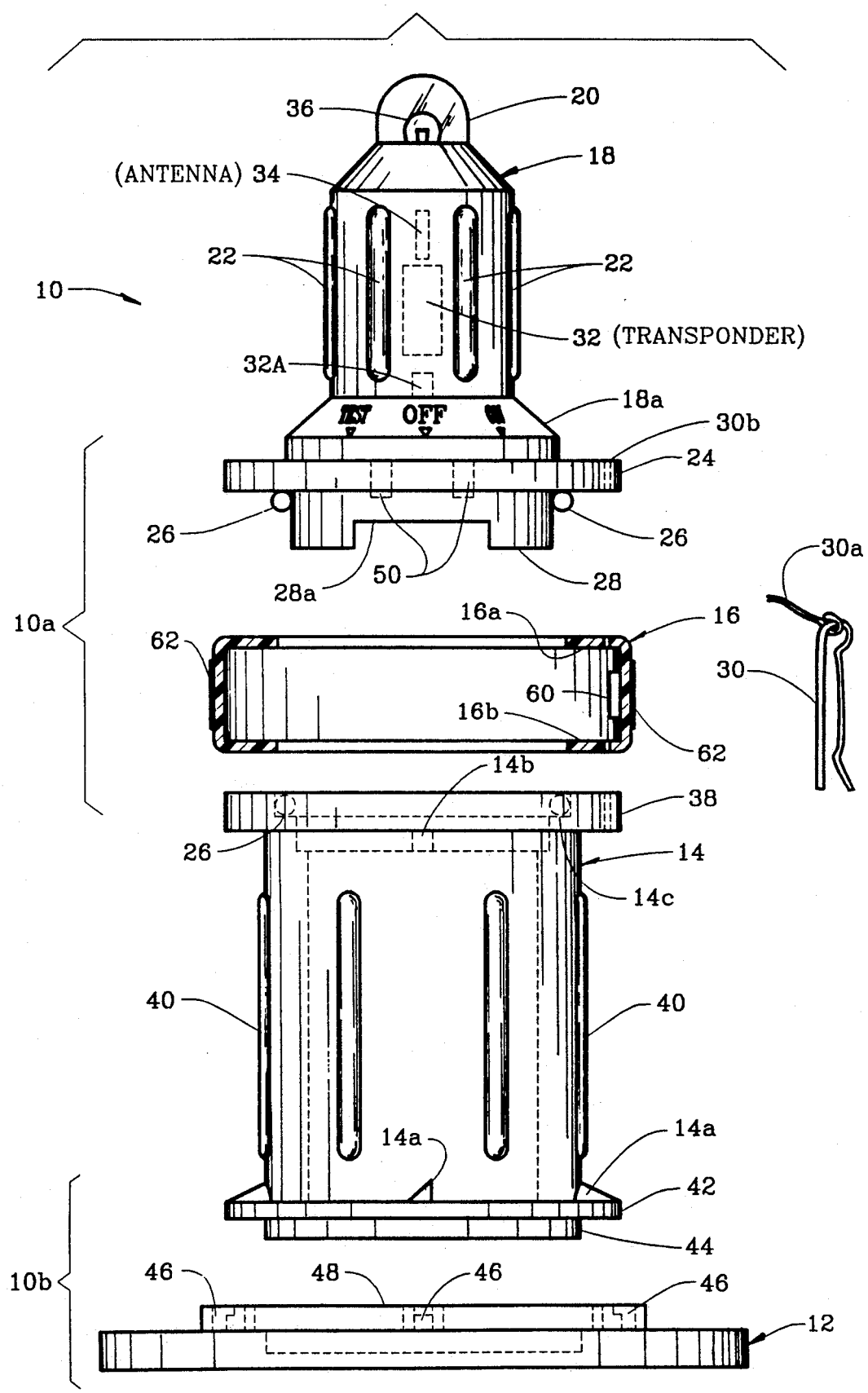
FIG. 1 is a side elevational view exploded showing the present invention.

Referring now to FIG. 1, the present invention is shown generally at 10 in an exploded view such that the invention 10 comprises a base mounting disk 12 which connects onto lower housing 14 which is cylindrical and contains a battery pack. The upper housing 18 is firmly connected into lower housing 14 by retaining ring 16 which engages a peripheral annular flange 24 near the bottom of upper housing 18 with the topmost peripheral annual flange 38 located at the top of lower housing 14, all of which is held together by retaining ring 16 between inside surfaces 16a and 16b in the closed position. Therefore, upper housing 18 and lower housing 14 are held in close proximity together by retaining ring 16 forming a housing assembly. The upper housing 18 has mounted rigidly therein radar transponder circuitry 32 and an antenna 34 for receipt and transmission of radar frequency signals, typically 9-gigahertz. The actual transponder circuitry and antenna themselves are not a part of this invention and are conventional in nature. Mounted at the very top of upper housing 18 is a clear plastic lens 20 that is watertight and sealed that contains a light bulb 36 that is connected to a socket and the power supply of the unit and is illuminated on a test basis or to allow the user to know that the device is ON with a periodic signal or as a visual indicator at night. An audio buzzer 32a is also mounted within the upper housing 18 and is used to provide an audio signal from the power supply when the device is turned to a "test" position and alert the user when the device is "ON" and a radar search signal has been received.

Of particular interest is that the upper housing has conical segments 18a and a cylindrical portion, the upper housing 18 being substantially hollow with raised longitudinal ridges 22 disposed at certain locations around the entire upper housing 18 on its exterior surface. The purpose of the longitudinal ridges 22 is to allow the upper portion to be grasped with one hand more easily for a firmer grip, even with a glove on, to allow one to rotate the upper housing relative to the lower housing 14 as is described in greater detail below.

Figure 2:
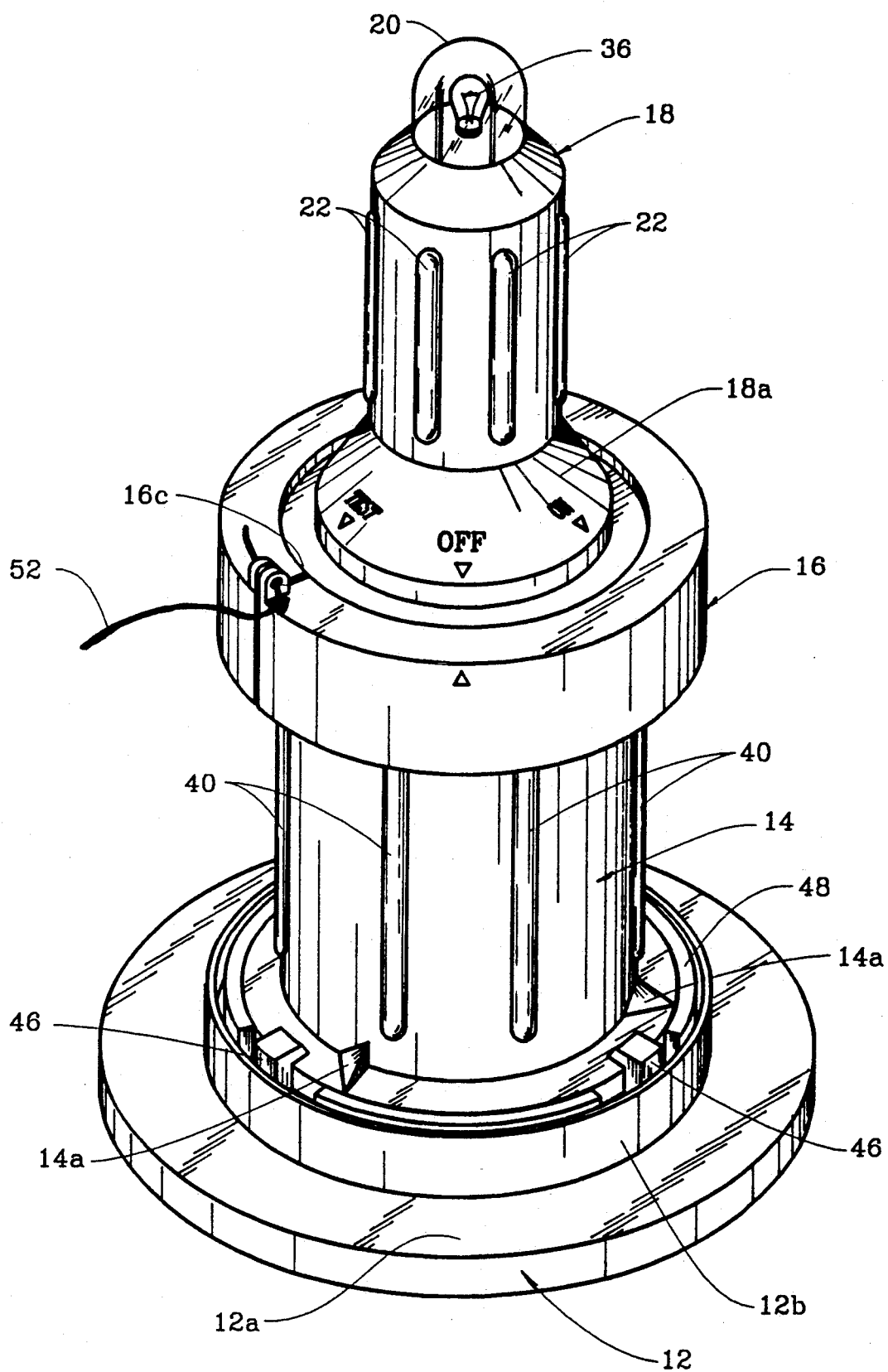
FIG. 2 is a perspective view of the present invention.

FIGS. 1 and 2 show the relationship of the upper housing 18 to the retaining ring 16 and lower housing 14, such that the lower housing includes longitudinal raised ridges 40 also about its periphery, so that to turn the device on and off, the upper housing 18 is rotated relative to the lower housing to either the "ON" position or "TEST" position. The retaining ring 16 is keyed by a flange or bump (not shown) to the lower housing 14 so that the magnet 60 retains its proper relative position relative to the reed switches in upper housing 18. The magnet could be located in the lower housing. In an alternate embodiment, the retaining ring with ridges could be rotated in lieu of the lower housing.

Referring back to FIG. 1, the upper wall of lower housing 14 includes a flange 14b which acts as a stop to engage the end portions of opening 28a, which form a stair step portion in the base peripheral wall 28 of upper housing 18. Opening 28a and flange 14b are configured in such a way so as to allow upper housing 18 to rotate approximately 90° relative to lower housing 14.

With the lower housing 14 engaged with upper housing 18, O-ring 26 which completely traverses the flange 24 and firmly engages the lower circular wall 28 of upper housing 18, fits as a seal between the wall 14c of lower housing 14 and wall 28, making the housing assembly when joined together watertight. When the upper housing 18 is firmly joined to the lower housing 14 by the retaining ring 16 as shown in FIG. 2, the retaining ring has a pair of apertures 16c which receive a lanyard 52 that ties the ends of the retaining ring securely together preferably with a square knot, preventing the retaining ring 16 and housing assembly from coming apart. In addition, reflective tape 62 may be added completely surrounding the retaining ring 16 to firmly secure the retaining ring in position. Note, however, when it is time to change the batteries, the lanyard 52 can be removed and untied and any reflective tape 62 around the outside of retaining ring 16 can be removed so that the retaining ring can then be removed which allows separation of the upper housing 18 from lower housing 14, permitting access to the interior batteries and other circuitry.

Figure 3:
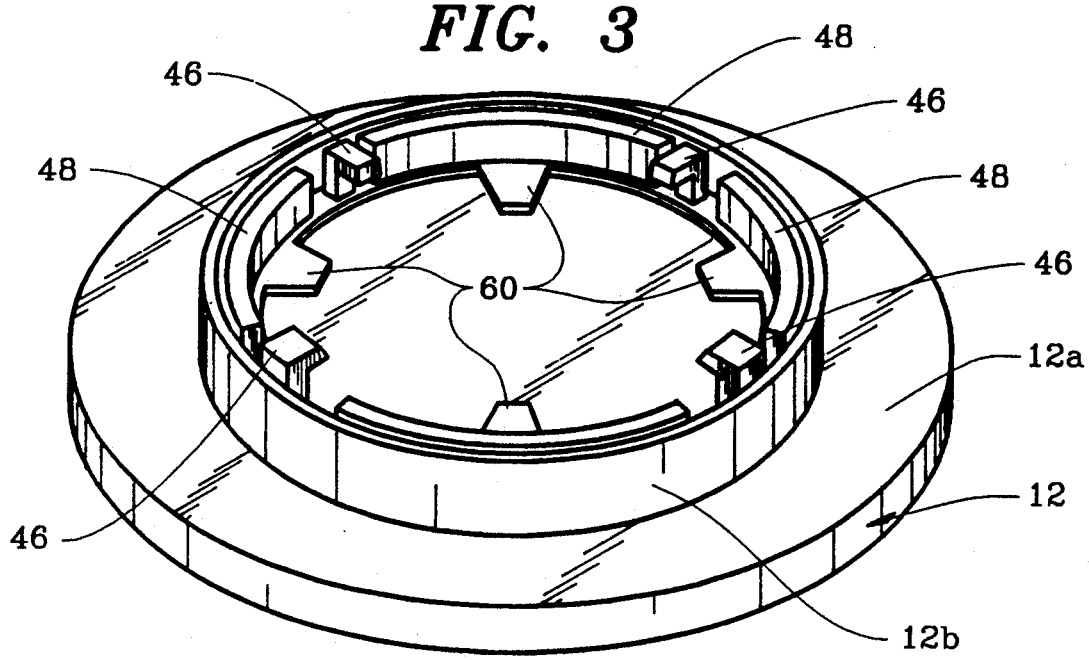
FIG. 3 is a perspective view of the mounting disk of the present invention.

Referring now to FIG. 3, the mounting disk 12 is shown, which includes an enlarged disk portion 12a connected to an interior ring integral with 12b that has a plurality of four fingers 46 which are flexible and move radially, the top of which extend radially inward beyond the inner wall segments 48. The lower portion of lower housing 14 as shown in FIG. 1 includes a peripheral circular flange 42 which has a circular lip that can be locked underneath the free ends of fingers 46, firmly locking the mounting disk 12 to lower housing 14 by merely snapping and pushing downward on the lower housing 14, forcing the fingers radially outward because of their angled edges and the fact that they are flexible, which allows them to snap over the lip 42. The fingers also have a tapered side edge to engage a cam for quick disconnect. Adjacent and disposed strategically at certain locations on lip 42 are raised smoothed tapered cam surfaces 14a which may be mounted at intervals to match the spacing of fingers 46 (shown at approximately 90°) and which can rotatably engage fingers 46 when the lower housing 14 is rotated relative to the mounting disk 12 in a preferred direction to allow the fingers 46 to become pressed outward radially so that the entire lower housing can be quickly removed vertically from the mounting disk 12. The purpose of mounting disk 12 is to allow the mounting disk 12 to be permanently mounted in a strategic location aboard ship or to the roof of a life raft. The SART can then be disengaged from the mounting disk on the ship when necessary if it is to be taken along into a life raft from the ship and quickly snapped in place on a separate, different mounting disk, which has been previously attached permanently to the life raft.

FIG. 3 shows spring tabs 60 formed as part of mounting disk 12 which hold the lower housing firmly in place against fingers 46 to prevent an inadvertent movement.

Therefore, the SART housing assembly is comprised of the upper housing, the lower housing, and the retaining ring. Mounting disks would be permanently attached to several locations around a ship and to various other locations on life rafts or the like so that the mounting disks could be used in conjunction with the present invention.

Figure 4:
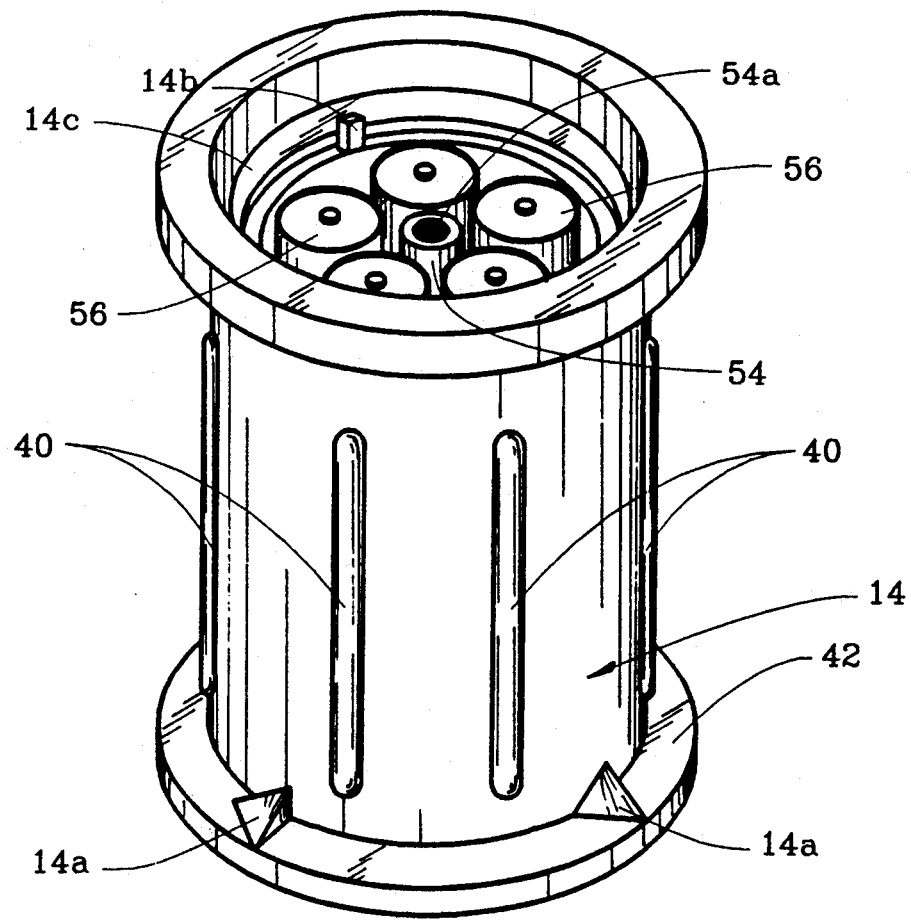
FIG. 4 shows a perspective view of the lower housing in accordance with the present invention.

FIG. 4 shows the unique configuration of the lower housing 14 in accordance with the present invention. A central, cylindrical column 54 is permanently molded to the base of the lower housing 14 on the inside in the center, and includes a threaded opening 54a that receives a threaded fastener. Five batteries 56 are mounted side-by-side in a circular array down inside the housing 14 to give the most compact array with the maximum battery pack available to reduce the length of the structure without greatly increasing its diameter. The central column 54 acts as an interior support for the battery pack and receives a top plate 58 as shown in FIG. 5 to hold the batteries longitudinally in place.

FIG. 4 also shows the interior ledge 14c which is annular in housing 14 that includes a flange 14b which acts as a stop to engage the end portions of opening 28a shown in FIG. 1 at the base of the upper housing 18 for the relative rotation stop between the upper housing 18 and the lower housing 14. Cam surfaces 14a along the base lip 42 laterally, when rotated, push fingers 46 outward so that the lower housing will release from the mounting ring when rotated onto the cam surface portions.

Figure 5:
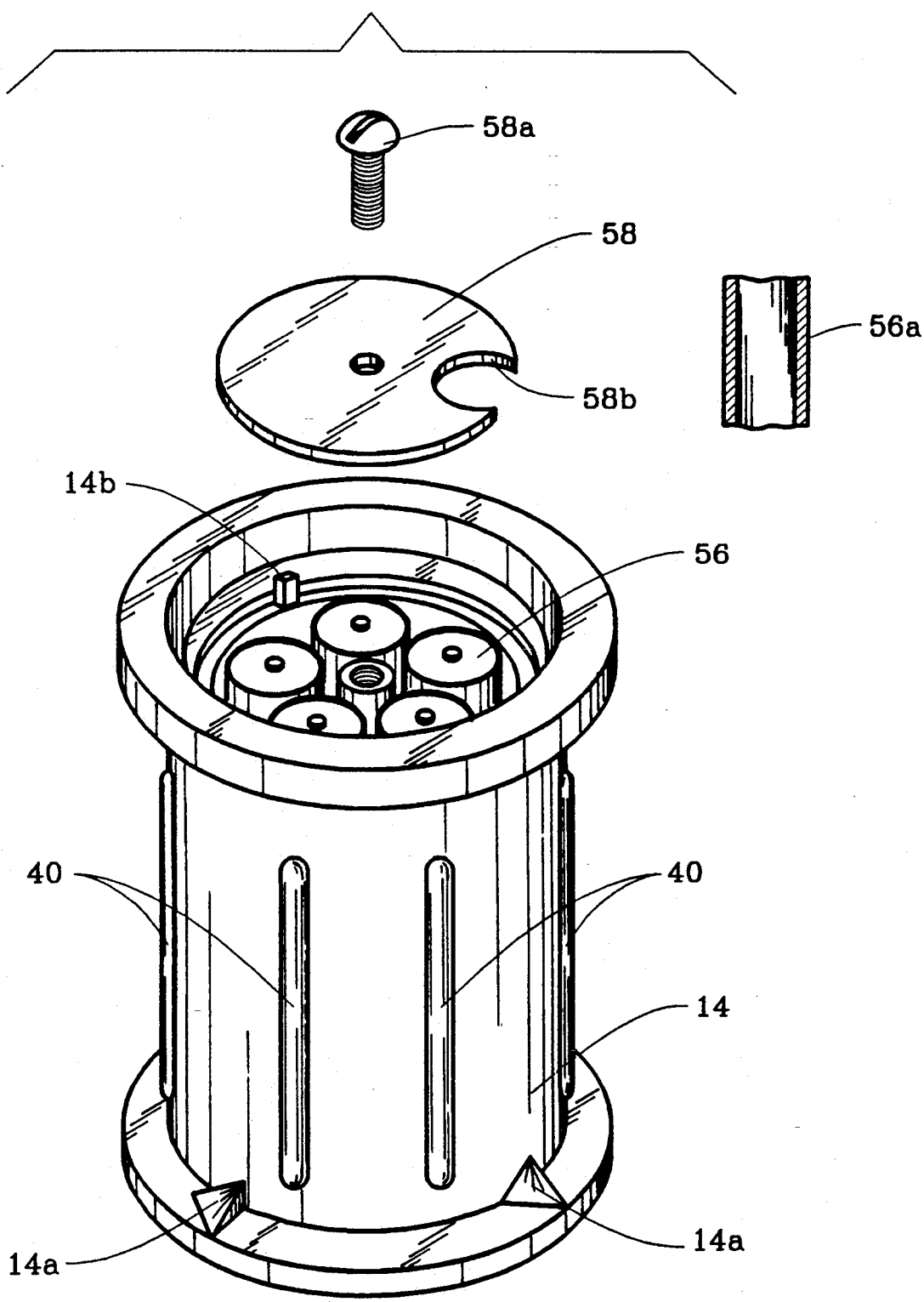
FIG. 5 shows a perspective partially exploded view of the lower housing of the present invention, including a battery pack holding plate.

FIG. 5 shows the retaining top plate 58 with a retaining screw 58a that allows the batteries 56 to be held in place within the lower housing 14. Foam cushion layers (not shown) may be used on top and below the batteries.

The wires 56a and connector (not shown) from the batteries are shown and pass through the opening 58b in plate 58.

Referring back to FIG. 1, the on/off actuation of the device occurs when the reed switches 50 in the upper housing are rotated in close proximity to the magnet 60. Thus, the device may be turned to a "test" position to show if the battery is working or to an "on" position. The metal pin 30 which has a lanyard attached thereto, 30a, which must be pulled out of the upper and lower housing flanges before the device can be used. The pin 30 is a safety device that provides one step of two steps required by regulation so that the housing will not accidentally be rotated prior to use. This is to save and preserve the batteries. The string 30a is to facilitate easy removing of the ring out of slot 30b and to prevent loss.

In a typical operation, the SART, in accordance with the present invention, would be mounted in an easily accessible/stored position aboard ship to a mounting ring 12 which is permanently affixed to a bulkhead on certain predetermined locations of the ship. The entire SART would be snapped into place as described earlier with the lower housing being engaged to the mounting disk 12. A user would then periodically test the device by rotating the upper housing relative to the lower housing, turning it to the test position. In addition, if the ship were sinking, the user could rotate the base housing a few degrees, allowing the cam surfaces 14a to push fingers 46 outwardly away, allowing for the upward quick-release of the entire SART, including the lower housing, from the mounting disk 12. The user can then use the lanyard shown in FIG. 2 as element 52 to secure the device while transporting and fastening the device to a life raft. A life raft would contain a mounting disk 12 so that the entire SART could be vertically pushed downward into the mounting disk and snapped into place on the life raft. If it has not been previously turned on, again, the device may be rotated so that the upper housing rotates relative to the lower housing, turning the device on. If neither a life raft nor the ship are available, if the user is in the water, the user can use the device while hand-held.

It is very important to appreciate the fact that the overall length of the device is approximately 200 millimeters or about four lengths of a C-size battery. However, even though the device is quite short longitudinally, it is really not very large radially or circumferentially, wherein it is slightly larger than five batteries arranged side-by-side in a circular array. This overall configuration greatly enhances the utilization of the present invention because it is not bulky, it is easily used, and can be conveniently stored without taking up excessive volume. Equally important, the configuration also lends itself for easy activation in that the user can readily grasp both the upper housing and the lower housing, one in each hand, and with the ridged surfaces, even with bulky mittens on, conveniently turn the device on since the entire housing assembly is the switch. The quick disconnect feature is very important when considered with shipboard use and life raft use, again being able to quickly disengage the entire SART from a more permanent mounting in an emergency with bulky gloves or mittens on, a very important feature. Finally, by using the retaining ring, the upper and lower housing switching which rotates relative to each other, is easily achieved while at the same time reducing the manufacturing costs and eliminating expensive fasteners which are also labor saving in the assembly process. The watertight integrity is maintained with the O-ring and retaining ring without having the elements under pressure to prevent cold flow in the plastic.

The housing could be used in other types of portable devices employing batteries, electronics, lights or RF signal devices.

What we claim is:

1. An improved housing assembly comprising:
   a water impervious upper housing said upper housing being substantially cylindrical, including a closed end and an open end, said open end having a first lip disposed about said open end;
   a water impervious lower housing being substantially cylindrically shaped, said lower housing sized to receive a plurality of batteries mounted in a circular side-by-side array, said lower housing including an annular lip, said lower housing having a closed end and an open end portion, said lip being disposed about said open end; and
   a resilient retaining ring sized to fit circumferentially about said upper housing and said lower housing and mountable over said first lip on said upper housing and said second lip on said lower housing engaging said first and second lips in a connecting relationship, whereby said retaining ring secures said upper housing to said lower housing when disposed around and joining said upper and lower housings together.

2. A housing assembly as in claim 1, including:
   a sealing O-ring, said O-ring sized to fit between said upper housing first lip and said lower housing annular lip when said retaining ring is mounted between said upper housing and said lower housing, thereby sealing the upper housing and lower housing when joined together from the ambient environment.

3. A housing assembly as in claim 1, including:
   a mounting disk, said mounting disk including at least one resilient radially movable finger, said lower housing including a lower lip for engaging said finger, said lower housing including a cam surface at a predetermined position to allow said lower housing to be disengaged from said finger by rotation of said lower housing engaging said cam surface, moving said finger outwardly away from said lip for quick disconnect of said lower housing from said mounting disk.

4. An improved housing as in claim 1, wherein:
   said upper housing and said lower housing are made of a durable, rigid, water impervious plastic.

5. An improved housing assembly for a Search and Rescue Transponder ("SART") comprising:
   a water impervious upper housing, said upper housing including a transponder and an antenna mounted therein, said upper housing being substantially cylindrical, including a closed end and an open end, said open end having a first lip disposed about said open end;
   a water impervious lower housing being substantially cylindrically shaped, said lower housing sized to receive a plurality of batteries mounted in a circular side-by-side array, said lower housing including an annular lip, said lower housing having a closed end and an open end portion, said lip being disposed about said open end;
   a resilient retaining ring sized to fit circumferentially about said upper housing and said lower housing and mountable over said first lip on said upper housing and said second lip on said lower housing engaging said first and second lips in a connecting relationship, whereby said retaining ring secures said upper housing to said lower housing when disposed around and joining said upper and lower housings together;

power supply means comprised of a plurality of batteries mounted within said lower housing;

means electrically connecting said battery power supply to said transponder and said antenna in said upper housing;

electrical switching means mounted relative to said upper housing and said lower housing, said switching means turning said transponder on or off when said upper housing is rotated relative to said lower housing to predetermined positions;

said upper housing and said lower housing exterior surfaces including a plurality of longitudinal ridges for gripping said upper housing and said lower housing; and means for retaining the batteries in the lower housing.

6. An improved housing assembly as in claim 3, wherein:

said battery power supply includes a plurality of five batteries arranged in the same plane circular side-by-side, said lower housing being sized in circumference and diameter as just slightly larger than the diameter of the circular array of said five batteries, providing a compact lower housing, said upper housing being sized substantially in diameter to fit snugly within said upper annular lip of said lower housing assembly, said entire housing being less than the overall length of four C-size batteries, providing a compact unit.

7. An improved housing assembly as in claim 5, wherein:

said switching means includes a magnet mounted in said retaining ring and a plurality of reed switches mounted in said upper housing at predetermined circumferential locations, said switching means including a test position for testing the batteries; and audio means connected to said switching means and said power supply for providing an audio signal whenever said switching means is moved to the test position and when said device is receiving incoming radar signals in said on position.

8. An improved housing assembly as in claim 7, including:

a light mounted at the top of said upper housing and connected to said switching means and said power supply, wherein when said switching means is moved to the test position and to the on position, said light is activated.

9. An improved housing assembly as in claim 5, including:

said upper housing having a predetermined step gap in thee bottom edge of the support wall, said lower housing having a stop movable within said upper housing step gap portion to permit partial rotation of said upper housing relative to said lower housing, whereby said upper housing cannot rotate past said stop connected to said lower housing past said step gap portion in said upper housing.

10. An improved housing assembly, comprising:

a water impervious upper housing, said upper housing being substantially cylindrical, including a closed end and an open end, said open end having a first lip disposed about said open end;

a water impervious lower housing being substantially cylindrically shaped, said lower housing sized to receive a plurality of batteries mounted in a circular side-by-side array, said lower housing including an annular lip, said lower housing having a closed end and an open end portion, said lip being disposed about said open end;

a resilient retaining ring sized to fit circumferentially about said upper housing and said lower housing and mountable over said first lip on said upper housing and said second lip on said lower housing engaging said first and second lips in a connecting relationship, whereby said retaining ring secures said upper housing to said lower housing when disposed around and joining said upper and lower housings together;

a sealing O-ring, said O-ring sized to fit between said upper housing first lip and said lower housing annular lip when said retaining ring is mounted between said upper housing and said lower housing, thereby sealing the upper housing and lower housing when joined together from the ambient environment;

a plurality of batteries mounted in a side-by-side array in said lower housing;

means electrically connecting said batteries to a device disposed within said upper housing;

electrical switching means mounted relative to said upper housing and said lower housing, said switching means including (a) a magnet mounted in said retaining ring;

(b) a plurality of reed switches mounted in said upper housing at predetermined circumferential locations;

(c) said means electrically connecting said batteries to said device disposed within said upper housing, said switching means for turning said device on or off when said upper housing is rotated relative to said lower housing to predetermined positions, said switching means further including a test position for testing the batteries;

audio means connected to said switching means and said batteries for providing an audio signal whenever said switching means is moved to the test position, said upper housing and said lower housing exterior surfaces including a plurality of longitudinal ridges for gripping said upper housing and said lower housing;

means for retaining the batteries in said lower housing;

a light mounted at the top of said upper housing and connected to said switching means and said power supply, wherein when said switching means is moved to the test position and to the on position, said light is activated;

said upper housing having a predetermined step gap in the bottom edge of the support wall, said lower housing having a stop movable within said upper housing step gap portion to permit partial rotation of said upper housing relative to said lower housing, whereby said upper housing cannot rotate past said stop connected to said lower housing past said step gap portion in said upper housing; and a mounting disk, said mounting disk including at least one resilient radially movable finger, said lower housing including a lower lip for engaging said finger, said lower housing including a cam surface at a predetermined position to allow said lower housing to be disengaged from said finger by rotation of said lower housing engaging said cam surface, said cam surface moving said finger outwardly away from said lip for quick disconnect of said lower housing from said mounting disk.

* * * * *